(12) United States Patent
Taranta, II

(10) Patent No.: US 9,405,623 B2
(45) Date of Patent: Aug. 2, 2016

(54) METHOD OF, AND APPARATUS FOR, LAYOUT RECTIFICATION OF ERASURE ENCODED STORAGE SYSTEMS

(71) Applicant: Xyratex Technology Limited, Havant (GB)

(72) Inventor: Eugene Mathew Taranta, II, Casselberry, FL (US)

(73) Assignee: Xyratex Technology Limited, Havant (GB)

( * ) Notice: Subject to any disclaimer, the term of this patent is extended or adjusted under 35 U.S.C. 154(b) by 129 days.

(21) Appl. No.: 14/037,075

(22) Filed: Sep. 25, 2013

(65) Prior Publication Data

US 2015/0089282 A1    Mar. 26, 2015

(51) Int. Cl.
*G06F 12/00* (2006.01)
*G06F 11/10* (2006.01)
*G06F 3/06* (2006.01)
*G06F 12/02* (2006.01)
*G06F 13/16* (2006.01)
*G06F 12/12* (2016.01)

(52) U.S. Cl.
CPC .......... *G06F 11/1076* (2013.01); *G06F 3/0679* (2013.01); *G06F 3/0689* (2013.01); *G06F 12/0238* (2013.01); *G06F 12/121* (2013.01); *G06F 13/1668* (2013.01); *G06F 2211/104* (2013.01); *G06F 2211/109* (2013.01); *G06F 2211/1057* (2013.01)

(58) Field of Classification Search
CPC . G06F 3/0679; G06F 3/0689; G06F 12/0238; G06F 12/121; G06F 13/1668
USPC .............. 711/114, 151, 154, 170; 712/10, 17, 712/210; 714/6.2, 6.22, 756, 770, 784
See application file for complete search history.

(56) References Cited

U.S. PATENT DOCUMENTS

| 6,128,277 A * | 10/2000 | Bruck et al. | 370/221 |
| 2008/0168225 A1* | 7/2008 | O'Connor | 711/114 |

* cited by examiner

*Primary Examiner* — Reba I Elmore
(74) *Attorney, Agent, or Firm* — Hall Estill Attorneys at Law

(57) ABSTRACT

There is provided a method of recovering configuration metadata from an erasure encoded RAID array. The RAID array includes raw data including a plurality of codewords encoded using Reed-Solomon encoding. The codewords include message data and checksum data, and the configuration metadata includes parameters relating to the layout of the RAID array. The method includes reading, from the RAID array, raw data including message data and checksum data. Then a set of linear equations are defined using the message data and checksum data. The linear equations are then solved and then, from the solved linear equations, one or more parameters relating to the layout of the RAID array are determined.

20 Claims, 5 Drawing Sheets

METHOD OF, AND APPARATUS FOR, LAYOUT RECTIFICATION OF ERASURE ENCODED STORAGE SYSTEMS

The present invention relates to a method of, and apparatus for, layout rectification of erasure encoded storage systems. More particularly, the present invention, to a method of, and apparatus for, layout rectification of Reed-Solomon erasure encoded storage systems Performance and data integrity are core requirements for modern storage systems. The ability to prevent and, if necessary, identify and correct data errors and corruptions is essential for operation of storage systems ranging from a simple hard disk drive up to large mainframe storage arrays.

One approach to improve the reliability and performance of a hard disk drive storage system is to employ redundant arrays of inexpensive disks (RAID) (also referred to as "redundant arrats of independent disks". RAID arrays are the primary storage architecture for large, networked computer storage systems.

The RAID architecture was first disclosed in "A Case for Redundant Arrays of Inexpensive Disks (RAID)", Patterson, Gibson, and Katz (University of California, Berkeley). RAID architecture combines multiple small, inexpensive disk drives into an array of disk drives that yields performance exceeding that of a single large drive.

There are a number of different RAID architectures, designated as RAID-1 through RAID-6. Each architecture offers disk fault-tolerance and offers different trade-offs in terms of features and performance. In addition to the different architectures, a non-redundant array of disk drives is referred to as a RAID-0 array. RAID controllers provide data integrity through redundant data mechanisms, high speed through streamlined algorithms, and accessibility to stored data for users and administrators.

RAID architecture provides data redundancy in two basic forms: mirroring (RAID 1) and parity (RAID 3, 4, 5 and 6). RAID 3, 4, 5, or 6 architectures generally utilise three or more disks of identical capacity. RAID 5 and 6 architectures are particularly popular and comprise "distributed parity" architectures in which the data and parity data are interleaved across the disks.

Data interleaving across the disks is usually in the form of data "striping" in which the data to be stored is broken down into stripe groups comprising a plurality of blocks called "stripe units". The "stripe units" are then distributed across the disks.

Therefore, should one of the disks in a RAID group fail or become corrupted, the missing data can be recreated from the data on the other disks. The data may be reconstructed through the use of the redundant "stripe units" stored on the remaining disks.

FIG. 1 shows a plurality of disk drives 10a-e forming a RAID 6 array 12. In FIG. 1, five drives are shown. However, any suitable number could be used. Each disk drive 10a-e can be accessed through a RAID controller to read/write data. A disk drive 10a-e within the RAID array 12 is known as a storage component.

As shown in FIG. 1, data is stored on the RAID 6 array 12 in the form of stripe groups comprising stripe units. Each stripe group A, B comprises five separate stripe units—stripe A comprises stripes A1, A2, A3 , $A_p$ and $A_q$. Stripe B comprises stripe units B1, B2, B3, $B_p$ and $B_q$. Therefore, the stripe units comprising each stripe (A1-A3 or B1-B3 respectively) are distributed across a plurality of disk drives, together with parity information $A_p$ and $A_q$ and $B_p$ and $B_q$ respectively. This provides data redundancy.

As shown in FIG. 1, each stripe unit in a stripe group is mapped to a different storage component in the array as a contiguous chunk of data. To map each stripe unit to a disk storage component creates two desirable properties. Firstly, most common I/O workloads can be parallelized across the storage components 10a-e forming the RAID array 12. Secondly, should a storage component fail, only one stripe unit in a stripe group will affected, aiding recovery.

Some stripe units in a stripe group will store data whereas others will store redundancy (checksum) parity information. Further, some implementations may reserve stripe units as distributed spare space inside of the RAID array for the purpose of accelerated recovery from storage component failure.

The arrangement, format, parameters and configuration of the particular stripe units across the drives of a RAID array is known as the layout. The layout may include, non-exhaustively, RAID array configuration parameters such as: information on the distribution of particular stripe groups, the number and size of the stripe units within those stripe groups, the size of the checksum symbols etc.

A number of rules exist which place certain bounds on the layout of a RAID array. One example of this is known as the layout goodness criteria as set out in "*On-Line Data Reconstruction In Redundant Disk Arrays*", PhD thesis, M. C. Holland, Carnegie Mellon University (1994).

How the data and parity information stripe units are distributed across the drives in an array is a function of the particular RAID software and is known as the unit mapping strategy. There are numerous strategies for how to layout data. In many cases, the layout is selected to eliminate areas of particularly high activity on the array ("hotspots") and maximise performance of the array.

The layout of a RAID array is stored as configuration metadata. The configuration metadata is, as can be appreciated, critical to operation of the RAID array. If the configuration metadata is lost or corrupted, the geometry of an array and its various attributes are then unknown, rendering the RAID array unusable. Configuration metadata may be lost for a number of reasons. An administrator error may cause the configuration metadata to be overwritten. Alternatively, a software error may be responsible.

However, irrespective of the cause, few robust methods of recovery are known. Recovery of a layout when configuration metadata is lost is problematic and, to date, no coherent solution exists. It is possible for a skilled RAID expert to handcraft a solution to configuration recovery from clues left in logs, fragments on disk, and intuition. However, this is highly situation- and operator skill-dependent.

More formal approaches to recovery from such catastrophic failures use, for example, probabilistic methods to attempt to recover key aspect of the configuration metadata. However, these tools are not widely discussed in the literature and have no guarantee of success.

Therefore, known storage systems suffer from a technical problem that known methods of recovering a layout of a RAID array when configuration metadata is lost are insufficiently accurate, robust or successful. The present invention is, in embodiments, directed to methods of recovery and further approaches to RAID array configuration that make such recovery more straightforward to help protect against data loss and corruption.

According to a first aspect of the present invention, there is provided a method for recovering configuration metadata from an erasure encoded RAID array, the RAID array comprising raw data comprising a plurality of codewords encoded using Reed-Solomon encoding, said codewords including message data and checksum data comprising a plurality of checksums, and said configuration metadata comprising parameters relating to the layout of said RAID array, the method comprising: a) reading, from said RAID array, raw data comprising message data and checksum data; b) defining, on a computing device, a set of linear equations using said message data and checksum data; c) solving, on a computing device, said set of linear equations; d) determining, from said solved linear equations, one or more parameters relating to the layout of said RAID array.

By providing such a method, array configuration parameters can be recovered after configuration metadata is lost. Storage component membership order, stripe-group size, stripe-unit size, and unit mapping functions are example array parameters which can be recovered or otherwise obtained to assist in rectification. Minimum assumptions are made about a lost configuration, although available knowledge can help to guide the recovery process.

In one embodiment, wherein step b) comprises forming a matrix equation based on said set of linear equations, said matrix equation comprising a matrix based on said raw data; step c) comprises inverting said matrix to obtain a set of coefficients; and step d) comprises utilizing said coefficients to obtain one or more parameters relating to the layout of said RAID array.

In one embodiment, said one or more parameters relating to the layout of said RAID array comprises a checksum basis vector used to generate one of said checksums comprising said checksum data.

In one embodiment, the method further comprises, subsequent to step c): e) verifying the or each checksum basis vector using a geometric series.

In one embodiment, the method further comprises repeating steps b) to d) to generate further checksum basis vectors for further checksums, each checksum basis vector being used to generate one of said checksums. A codeword comprises the message data and all checksums together. The checksum basis vector is the set of coefficients used to generate a single checksum. Each checksum basis vector is recovered turn, one for each checksum. This enables important parameters of the configuration metadata to be recovered.

In one embodiment, the RAID array comprises a plurality of stripe groups, each stripe group comprising a plurality of stripe units, and said one or more parameters relating to the layout of said RAID array comprises the stripe unit size and the method further comprises: f) iterating through said codewords to identify a change in codeword permutation; and g) identifying the stripe unit size based on said change in codeword permutation.

In one embodiment, said one or more parameters relating to the layout of said RAID array comprises the unit mapping strategy; and the method further comprising: h) obtaining said unit mapping strategy based on said plurality of checksum basis vectors and said stripe unit size by: i) recovering the position of said stripe units within an array from said checksum basis vectors; and j) repeating step i) for multiple sequential stripe groups to obtain the unit mapping strategy.

In one embodiment, said one or more parameters relating to the layout of said RAID array comprise the stripe group width; the number of message data units per stripe; the number of checksum data units per stripe; and the symbol size and wherein said parameters are determined empirically prior to step a).

In one embodiment, the method further comprises, subsequent to step d): k) rebuilding said configuration metadata from the one or more determined parameters relating to the layout of said RAID array.

In one embodiment, the method further comprises, subsequent to step k): l) verifying data consistency across the entire RAID array.

In one embodiment, the step of verifying data consistency across the entire RAID array comprises performing a parity check on the raw data on the RAID array.

In one embodiment, the method further comprises, subsequent to step l): m) bringing the RAID array online with said rebuilt configuration metadata.

According to a second aspect of the present invention, there is provided a RAID hardware controller operable to recover configuration metadata from an erasure encoded RAID array, the controller being operable to carry out the steps of the first aspect.

According to a third aspect of the present invention, there is provided a storage apparatus comprising at least one storage device and the controller of the second aspect.

According to a fourth aspect of the present invention, there is provided a non-transitory computer usable storage medium having stored thereon a computer program product executable by a programmable processing apparatus, comprising one or more software portions for performing a method according to the first aspect.

According to a fifth aspect of the present invention, there is provided a method of encoding data in an erasure encoded RAID array to facilitate recovery in the event of the loss of configuration metadata, the method comprising: a) utilizing Reed-Solomon encoding to encode message data and an array unique identifier to form a codeword comprising message data and checksum information comprising a plurality of checksums; b) writing said codeword to said RAID array; wherein in step a) said basis root is greater than one for all checksums.

In one embodiment, step a) further comprises: c) translating said message data using a involutary function to generate translated message data and translated checksum information; and step b) further comprises d) writing untranslated message data to said RAID array; and e) writing translated checksum data to said RAID array.

According to a sixth aspect of the present invention, there is provided a method of encoding data in an erasure encoded RAID array to facilitate recovery in the event of the loss of configuration metadata, the method comprising: a) utilizing Reed-Solomon encoding to encode message data to form a codeword comprising message data and checksum information comprising a plurality of checksums; b) translating said message data using an involuntary function to generate translated message data and translated checksum information; c) writing untranslated message data to said RAID array; and d) writing translated checksum data to said RAID array.

In one embodiment, the involutary function is a non-cryptographic hash function.

According to a seventh aspect of the present invention, there is provided a method of encoding data in an erasure encoded RAID array to facilitate recovery in the event of the loss of configuration metadata, the method comprising: a) utilizing Reed-Solomon encoding to encode message data to form a codeword comprising message data and checksum information comprising a plurality of checksums, said message data being encoded using a w-bit basis root for the basis vector for the or each checksum, said w-bit basis root storing configuration parameters for said RAID array; and b) writing said codeword to said RAID array.

By providing such a method, a w-bit Galois field element can be encoded into the encoded data such that the w-bit Galois field element serves as the basis root for the basis vector. Further, the w-bit Galois field element is selected so that each of the w-bits represents configuration parameters. Therefore when the basis root is recovered, so are those configuration parameters. This aids in recovery of the layout.

In one embodiment, said w-bit basis root for the basis vector comprises one or more configuration parameters selected from the list of: CRC field; number of checksums per stripe group; stripe number; array number; and a first row of the unit mapping identifier.

In one embodiment, the w-bit basis root comprises either an 8, 16 or 32 bit basis. root.

Embodiments of the present invention will now be described in detail with reference to the accompanying drawings, in which.

Figures 5, 6:
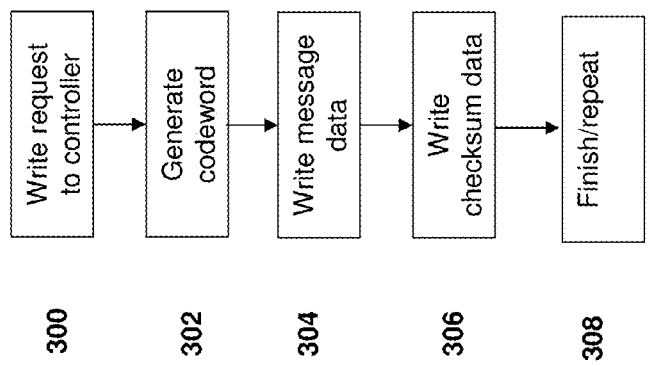

FIG. 5 a) to d) show schematic diagrams of known unit mapping strategies across RAID devices; and FIG. 6 shows a flow chart of a method of generating encoded data according to a second embodiment of the present invention.

Figure 1:
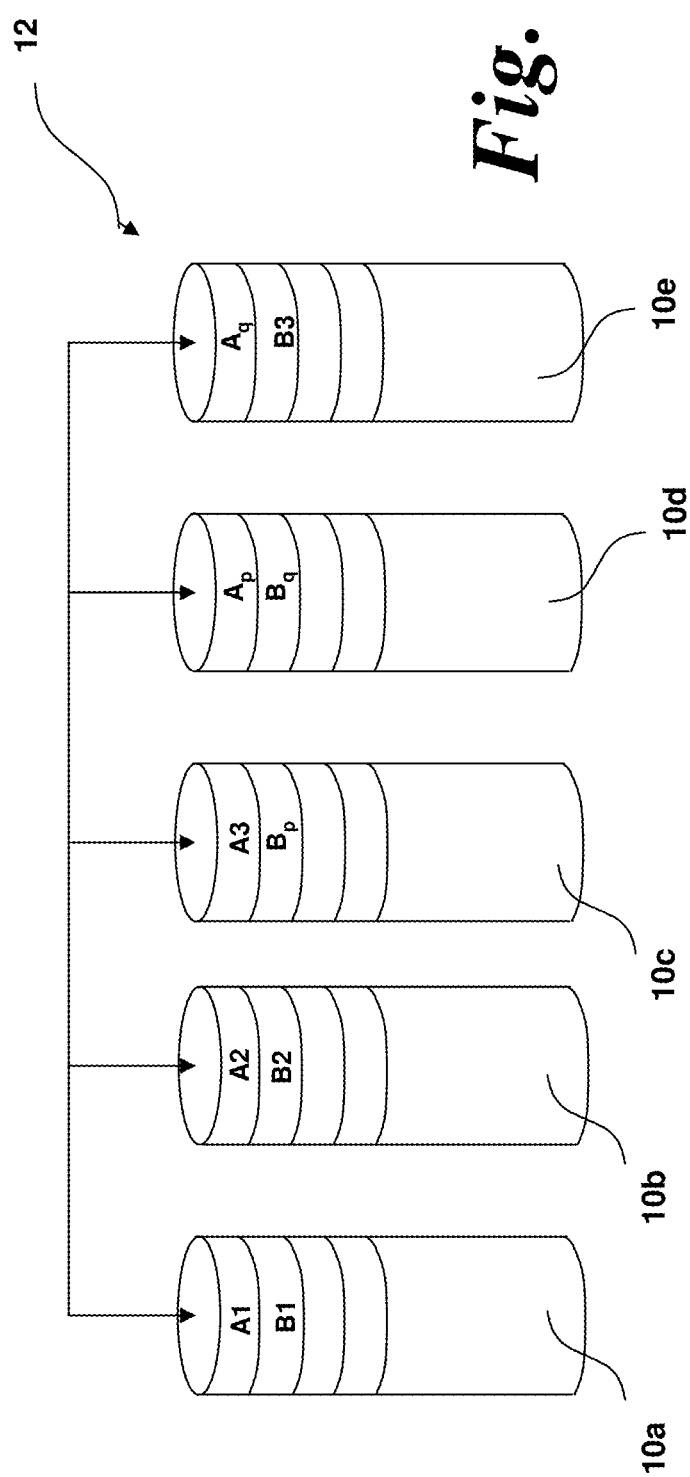
FIG. 1 is a schematic diagram of a RAID array.
Figure 2:
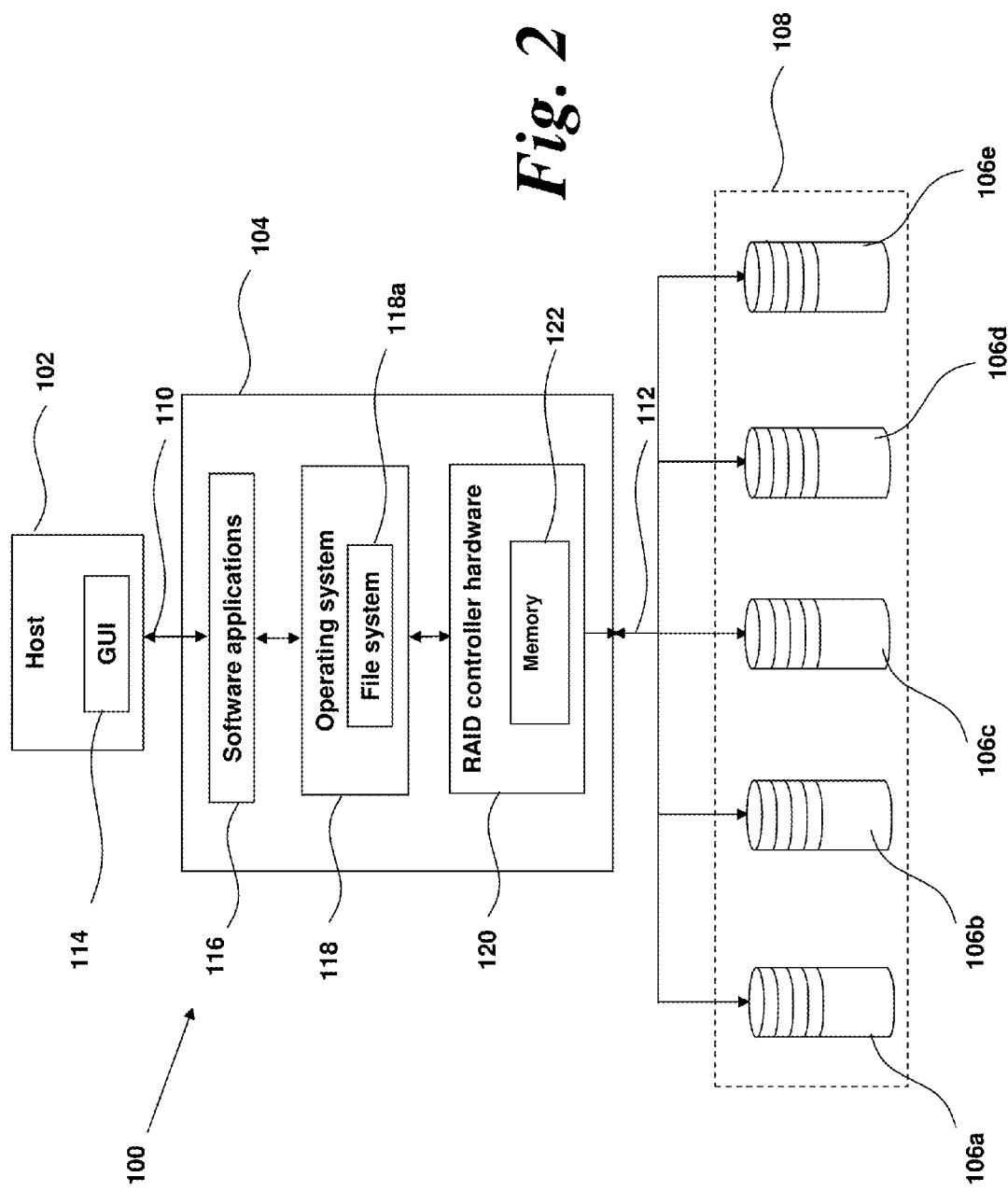
FIG. 2 is a schematic diagram showing a RAID controller of an embodiment of the present invention.

FIG. 2 shows a schematic diagram of a storage resource 100 that may be used with the present invention. The storage resource 100 comprises a host 102, a RAID controller 104, and storage devices 106a, 106b, 106c, 106d and 106e which, together, form part of a RAID 6 array 108.

The host 102 is connected to the RAID controller 104 through a communication network 110 such as an Ethernet and the RAID controller 104 is, in turn, connected to the storage devices 106a-e via a storage network 112 such as an iSCSI network.

The host 102 comprises a general purpose computer (PC) which is operated by a user and which has access to the storage resource 100. A graphical user interface (GUI) 114 is run on the host 102. The GUI 114 is a software application which acts as a user interface for a user of the host 102.

The RAID controller 104 comprises a software application layer 116, an operating system 118 and RAID controller hardware 120. The software application layer 116 comprises software applications including the algorithms and logic necessary for the initialisation and run-time operation of the RAID controller 104. The software application layer 116 includes software functional blocks such as a system manager for fault management, task scheduling and power management. The software application layer 116 also receives commands from the host 102 (e.g., assigning new volumes, read/write commands) and executes those commands. Commands that cannot be processed (because of lack of space available, for example) are returned as error messages to the user of the host 102.

The operation of the RAID controller 104 may be set at the Application Programming Interface (API) level. Typically, Original Equipment Manufactures (OEMs) provide RAID networks to end users for network storage. OEMs generally customise a RAID network and tune the network performance through an API.

The operating system 118 utilises an industry-standard software platform such as, for example, Linux, upon which the software applications forming part of the software application layer 116 can run. The operating system 118 comprises a file system 118a which enables the RAID controller 104 to store and transfer files and interprets the data stored on the primary and secondary drives into, for example, files and directories for use by the operating system 118.

The RAID controller hardware 120 is the physical processor platform of the RAID controller 104 that executes the software applications in the software application layer 116. The RAID controller hardware 120 comprises a microprocessor, memory 122, and all other electronic devices necessary for RAID control of the storage devices 106a-e.

The storage devices 106 may take any suitable form; for example, tape drives, disk drives, non-volatile memory, or solid state devices. Although most RAID architectures use hard disk drives as the main storage devices, it will be clear to the person skilled in the art that the embodiments described herein apply to any type of suitable storage device. More than one drive may form a storage device 106; for example, a RAID array of drives may form a single storage device 106. The skilled person will be readily aware that the above features of the present embodiment could be implemented in a variety of suitable configurations and arrangements.

As set out above, the term "storage device" in the context of the following description may refer to a logical drive which is formed on the RAID array 108. In this case, a sector refers to a portion of the logical drive created on the RAID array 108. The following embodiment of the present invention is applicable to any of the above described arrangements.

In this embodiment, the storage devices 106 are formatted such that each sector comprises 512 bytes (4096 bits). The term "sector" used herein is generally applicable to any sector sizes. Therefore, the term "sector" is merely intended to indicate a portion of the storage availability on a storage device and is not intended to be limited to any of the disclosed examples. Additionally, sector may be used to refer to a portion of a logical drive, i.e. a virtual drive created from a plurality of physical hard drives linked together in a RAID configuration.

Further, whilst only a single server and RAID array is shown in FIG. 2, any number of RAID controllers 104 may be provided to serve any number of storage devices forming an array.

The RAID controller 104 stores configuration metadata for the RAID array 108. This denotes the configuration of data storage on the RAID array 108 as described above. The present invention is concerned with a situation where such metadata is lost, corrupted, or maliciously destroyed and there is insufficient knowledge to manually restore the configuration. These parameters need to be recovered to enable to the RAID array 108 to function.

These parameters need to be recovered from the raw data in the RAID array when the configuration metadata is lost. Recovery becomes even more important when an administrator has no backup of the data on the array. In general, if the configuration metadata is lost, the data remaining on the RAID array is still likely to be valid and can be recovered. However, care must be taken in this regard. An administrator error during recovery, for example to redefine the RAID array in the wrong disk order or with the wrong unit size, can permanently destroy the data on the RAID array 108.

As set out above, without the RAID array configuration parameters as specified in the configuration metadata, the RAID array 108 comprises entirely raw data, the format and/or configuration of which is unknown. The recovery of the array configuration parameters from the raw data on the RAID array 108 is known as layout rectification. Layout rectification attempts to recover the parameters which are required to restore an array to a functional state. These may include, for example, storage component membership, position information, stripe-group width, stripe-unit size etc.

As is well known, the RAID level of an array, in part, describes the level of protection afforded against storage component failures. For example, RAID 5 arrays can only survive a single failure or corruption within a stripe, whereas RAID 6 arrays can survive two failures or corruptions within the same stripe.

In some cases, the RAID level also defines how checksum data is calculated. RAID 5 implements XOR-based parity. However, RAID 6 can be implemented with a greater variety of codes. For example an EVENODD code or an RDP code may be used. Combinations are possible, with the "P" parity of RAID 6 being calculated from XOR and the "Q" parity being calculated from a Reed-Solomon (RS) code.

The present invention is operable, in one aspect, to enable more accurate and reliable layout rectification for Reed-Solomon (RS) erasure encoded RAID arrays. In another aspect the present invention provides an improved method of encoding an RS code to create a configuration-aware code to facilitate layout rectification. This substantially increases the probability of a successful recovery.

"Erasures" within RAID array systems are defined as detected data losses such as complete device failures or latent sector errors. They do not include, for example, silent data corruption. An erasure code is an error correcting code that extends message data with checksum data in a way that known lost or "erased" data can be recovered from the available remaining data. One especially popular code is the RS erasure code.

The operation of an RS code is to transform inputted user data (known as message data) into a codeword. Each codeword is a vector comprising a plurality of symbols, where each symbol is of w-bit width (where w is any positive integer having a value greater than 2).

An RS code, specifically, comprises a linear code of the format [n, k, d]. Where the code comprises n symbols of w-bit width. Of those n symbols, k symbols comprise message data and m (where m=n−k) symbols comprise checksum data. D is the minimum Hamming distance between any two valid codewords. In other words, at least D symbols in a codeword must be modified to generate another valid codeword. In general, when the number of erasures is less than d, then the original codeword can be determined from the remaining symbols. In a RAID 6 array, D=3. Therefore, any combination of two erasures can be tolerated by the system.

Reed-Solomon codes are non-binary cyclic codes with symbols made up of w-bit symbols. Reed-Solomon codes on w-bit symbols exist for all n and k for which:

$$0 < k < n \text{ and } n < 2^w \qquad 1)$$

The codeword is the combination of message and checksum symbols together. All of the w-bit words at the same offset within each stripe unit in a stripe group is equivalent to the codeword.

When applied to RAID, n is the stripe group width, i.e. the number of stripe units per stripe group, k is the number of data (or message) stripe units per stripe group and m is number of parity (or checksum) stripe units per stripe group.

The size of the stripe group in storage terms is then a function of the stripe unit size and the number of stripe units per group, n. However, the stripe unit size is usually selected to be a multiple of w so that a plurality of codewords can be stored within a single stripe. For instance, given a stripe unit size of 4 KiB and symbol size w of 16 bits, each stripe unit comprises 2048 codewords. Further, each symbol in the codeword is stored on a different stripe unit so that when any unit is lost, only one symbol from the codeword is lost.

Figure 3:
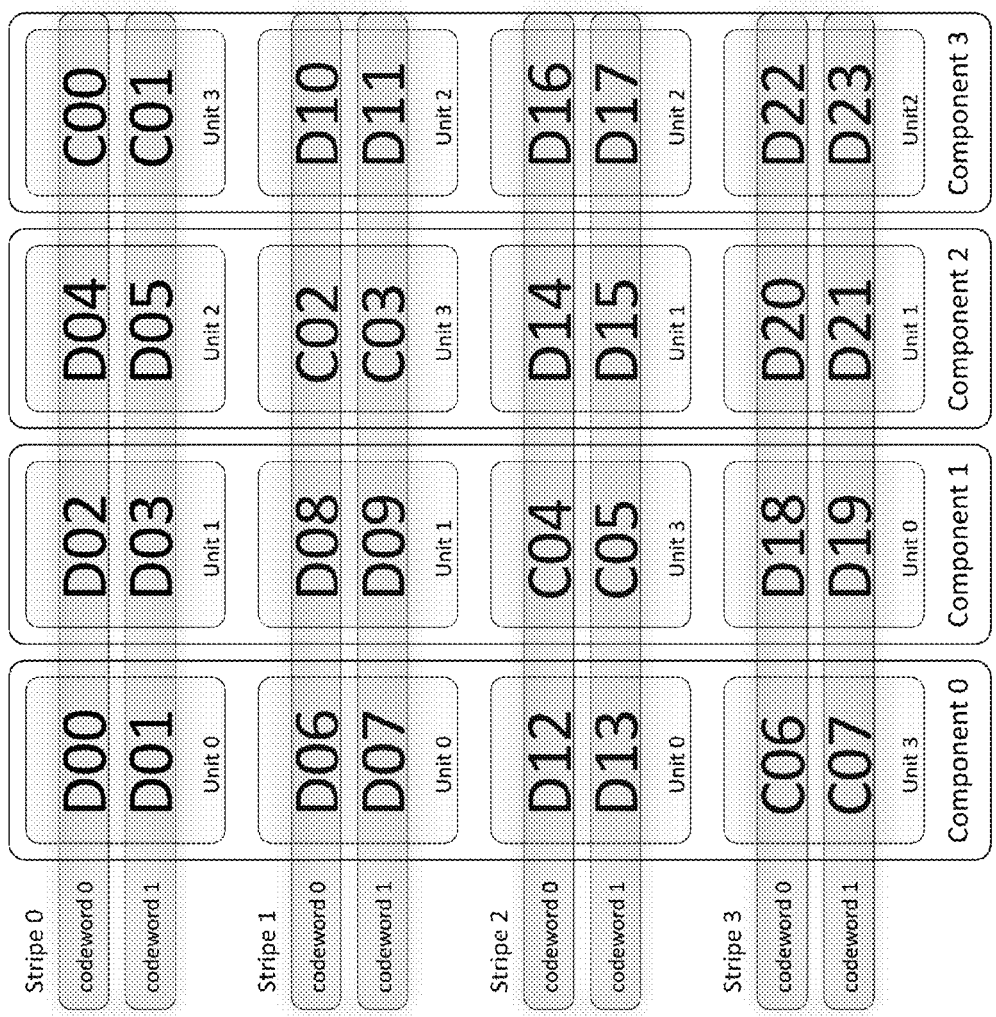
FIG. 3 is a schematic diagram of the distribution of codewords across stripe groups and stripe units in an exemplary RAID array.

FIG. 3 shows a schematic diagram of the relationship between a RAID array layout and the RS code symbols. In this example, n=4, k=3 and m=1. The symbol size w is 8 bits in this example and so two symbols are provided per stripe unit. The stripe unit size is 16 bits and so the stripe width is 64 bits in size. Each codeword comprises four symbols and two codewords are provided per stripe group.

RS arithmetic is carried out inside of a Galois field (denoted as $GF(2^w)$). In order to transform a message into a codeword, a generator matrix (G) is required, as set out in expression 2):

$$G=[I_k|P] \qquad 2)$$

where $I_k$ is the k×k identity matrix and P is a k×m matrix. Row vector c is an n component codeword and row vector D is the k component message data. A specific codeword c is generated from message data such that (equation 3):

$$c=dG \qquad 3)$$

The final m components of c are the checksum symbols and these are generated with P. Elements of P must be selected carefully so that its column rank is m. In doing so, P is often defined to be a submatrix of the Vandermonde matrix as set out in expression 4):

$$V = \begin{bmatrix} \alpha_0^0 & \alpha_1^0 & \alpha_2^0 & \dots & \alpha_{m-1}^{k-1} \\ \alpha_0^1 & \alpha_1^1 & \alpha_2^1 & \dots & \alpha_{m-1}^{k-1} \\ \vdots & \vdots & \vdots & \ddots & \vdots \\ \alpha_0^2 & \alpha_1^2 & \alpha_2^2 & \dots & \alpha_{m-1}^{k-1} \end{bmatrix} \qquad 4)$$

such that each $\alpha_x$ is a unique field element in $GF(2^w)$. Notice that every column is a geometric progression of $\alpha_x$. In constructing P, any m columns can be chosen from V. In practice the first checksum is constructed with $\alpha_0=1$ to avoid the multiplication steps, so that all that remains is to XOR together the message data. In one embodiment, the second checksum is constructed with $\alpha_1=2$.

Given that the RS approach to RAID only requires checksum data, the set of linear equations can be expressed more concisely as:

$$c_i = dP^*_{,i} \qquad 5)$$

Where equation 5) can be expressed as:

$$= \sum_{j=0}^{k} \alpha_i^j d_j \qquad 6)$$

where $c_i$ is the $i^{th}$ checksum in codeword c with $0 \le i < m$. $P^*_{,i}$ denotes the $i^{th}$ column vector of P, and $d_j$ is the $j^{th}$ component in message D with $0 \le j < k$. $\alpha_i$ as the basis root of checksum $c_i$ and $P^*_{,i}$ as its basis vector.

In other words, the RS checksum data is the result of a linear equation. For instance, taking expression 6) in longhand format, Q parity on a RAID 6 array is encoded as:

$$Q = 2^0 d_0 + 2^1 d_1 + 2^2 d_2, \dots, +2^{n-1} d_{n-1} \qquad 7)$$

Q and $d_0$ through $d_{n-1}$, are all stored on the disks 106 comprising the array 108. However, without analysis, it cannot be determined which information is parity information and which is message data. The present invention addresses, amongst other things, this matter.

Nevertheless, the encoding coefficients ($\alpha_i^x$) are a geometric series and the power of each coefficient (x) relates to the position of data in the code. Therefore, to recover the position of data and parity in the code is equivalent to recovering the coefficients, which can be performed, in one embodiment, using linear algebra.

By way of brief overview of the present method, it is possible to define a set of k linear equations, treating the checksum coefficients as unknown quantities. This produces a matrix of the raw data D on the array 108 multiplied against a set of unknown coefficients u resulting in a vector of raw data d. So, D*u=d. To obtain the coefficients, the raw data matrix can be inverted and left multiplied such that u=D⁻¹d.

Figure 4:
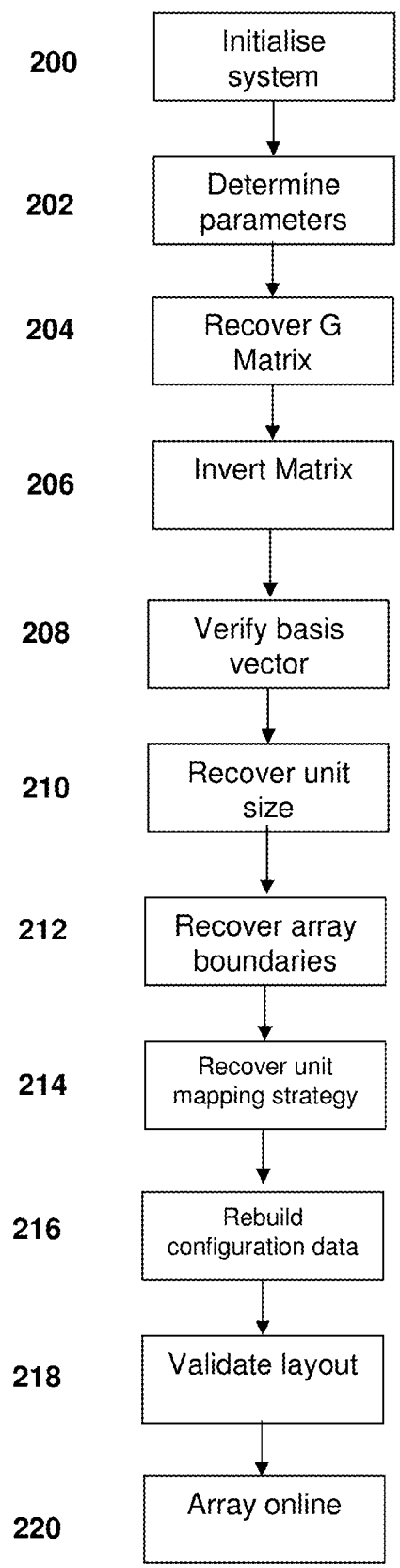
FIG. 4 shows a flow chart of a method according to a first embodiment of the present invention.

The first embodiment of the present invention provides a method for recovering the configuration metadata based on an analysis of the above RS approach. FIG. 4 shows a flow chart of a method according to the first embodiment.

Step 200: Initialise System

At step 200, the recovery system is initialised. The recovery system may comprise a software application run on the storage system 100 e.g. as a software application 116 run on the operating system 118. Alternatively, and non-exhaustively, the recovery system may be run from a remote server or from hardware or firmware.

The recovery system is operable to read and analyse raw data on a RAID array 108 and to determine key parameters of the configuration metadata. Assuming the entire configuration metadata of a RAID array has been lost, the following parameters need to recovered:
1) Stripe-group width n;
2) Message data units per stripe k;
3) Checksum data units per stripe m;
4) Symbol size w;
5) Basis root for each checksum in the code;
6) Unit size;
7) Unit mapping strategy;
8) Array membership, and
9) Boundaries of the array.

The method then proceeds to step 202.

Step 202: Determine Known or Assumed Parameters

To simplify the process, a number of assumptions can be made to place constraints on the rectification process. This reduces the amount of computation required.

Firstly, it can be assumed that the RAID array 108 starts at the same offset on each storage component 106 in the RAID array 108.

It can also be assumed that the symbols of a specific codeword are mapped to the same offset within each storage component 106.

Finally, it can be assumed that the symbol size w is fixed across the whole RAID array 108 implementation.

These assumptions are not essential and are to be taken as non-limiting. However, they provide a mechanism to reduce the search space and reduce the complexity of the operation and the time required to complete the operation.

The present method relates to the determination of configuration parameters in the case of n storage components when it is known that they comprise part of a single RAID array 108 as shown in FIG. 2.

In general, n, k, and m, are also known without needing to analyse the array 108 data in detail. This is because these parameters are general and known at initialisation or the array 108. Therefore, the following steps of the analysis can focus on the remaining parameters as set out in step 200.

The method proceeds to step 204.

Step 204: Recover Generator Matrix—Define Linear Equations

Equation 5) above defines checksum data to be the inner product of message data D and a geometric progression of coefficients, i.e. the basis vector i (i.e., $P^*_{,i}$) Expressed differently, codeword c is the combined message data and generated checksum data, defined as c=dG (equation 3)).

Both the message data and checksums are stored in the RAID array 108 raw data. However, which data is message data and which data is checksum (parity) data is unknown at this stage. Nevertheless, even when the layout parameters remain unknown, the structure of the code, and how D and c are related, is known from the raw data and from the RS coding process as set out above.

To recover the code, the generator matrix must be recovered from the raw data.

In step 204, each basis vector i is recovered in turn by treating its vector components as unknown quantities building a set of linear equations that can solve for these unknown quantities.

The data set comprises k unknowns, and so k raw data equations must be stacked. As can be appreciated, these equations must come from the same permutation in the unit mapping strategy. However, because a specific permutation is repeated stripe-unit length times to the end of a stripe group, a single sector worth of symbols across each unit will likely yield more equations than is actually needed. Consider, for example, that when w=16 bits and the storage component sector size is 512 B, a single sector contains one symbol from 32 different codewords.

As set out above, it is not known which stripe units store message data and which stripe units store checksum data. Therefore, each combination of k linear equations taken from the raw data is required to be tested. The basis vector recovery equation is expressed as follows:

$$\begin{bmatrix} d_{0,0} & d_{0,1} & \ldots & d_{0,k-1} \\ d_{1,0} & d_{1,1} & \ldots & d_{1,k-1} \\ d_{2,0} & d_{1,1} & \ldots & d_{2,k-1} \\ \vdots & \vdots & \ddots & \vdots \\ d_{k-1,0} & d_{k-1,1} & \ldots & d_{k-1,k-1} \end{bmatrix} \begin{bmatrix} u_1 \\ u_2 \\ u_3 \\ \vdots \\ u_{k-1} \end{bmatrix} = \begin{bmatrix} d_{0,k} \\ d_{1,k} \\ d_{2,k} \\ \vdots \\ d_{k-1,k} \end{bmatrix} \quad 8)$$

Or, more concisely:

$$Du = d_k \quad 9)$$

where D is the raw data matrix. Each element $d_{x,y}$ is the $x^{th}$ symbol on storage component y and column vector u is a set of unknown coefficients that transforms D into column vector $d_k$.

The above matrix can be generated based on the remaining raw data in the RAID array 108.

The method then proceeds to step 206.

Step 206: Recover Generator Matrix—Invert Matrix

At step 206, it is determined whether the raw matrix data D is invertible. If the raw data matrix D is invertible, then the unknown coefficients are recovered using equation 10):

$$u = D^{-1} d_k \quad 10)$$

In the situation where raw data on the left hand side of Equation 10) is message data and the right hand side is checksum data, then u is the basis vector.

The method then proceeds to step 208.

Step 208: Recover Generator Matrix—Verify Basis Vector

In step 208, the basis vector determined in step 206 is verified. Whether u is a basis vector can be verified by using a property of geometric series as set out in equation 11):

$$\sum_{i=0}^{n-1} z^i = \frac{1-z^n}{1-z} \qquad 11)$$

Equation 11) expressed in recovery terms is set out in equation 12):

$$u \cdot \overset{\nu}{1} = \frac{1-\alpha_i^k}{1-\alpha_i} \qquad 12)$$

Where u is a basis vector and $\overset{\nu}{1}$ is a vector of k ones.

In a RAID 6 system which has fixed basis roots, the right hand side of Equation 12) for each basis root can be computed such that the component summation of u can be directly compared.

A match indicates that a candidate basis root has been identified. Otherwise, if a RAID system uses non-standard basis roots, the component in u that solves Equation 12) is a candidate basis root.

Further, in addition to satisfying the constraints of Equation 10), the components of u must form a geometric progression of the candidate basis root.

However, there may be rare situations in which random data may generate u that appears to be correct. Therefore, it is important that the layout should be empirically validated before the array is brought back online.

Once the basis vectors are recovered, one permutation of the unit mapping strategy is also recovered. That is, the position of message data in the codeword is related to the exponent of each component in u by $\log_{\alpha_i} . u_\alpha$ Nevertheless, the stripe unit number and unit mapping strategy are still unknown and so the position of storage components in the array cannot be determined until later steps have been carried out.

The method proceeds to step 210.

Step 210: Recover the Unit Size

In many cases, the permutation changes at each stripe boundary. For layouts where this is the case, the unit size can be recovered by observing the change in permutation at the boundaries.

Therefore, in such cases, at least one permutation of the unit mapping strategy is learned when the generator matrix G is recovered. However, as set out above in relation to step 208, the relationship of the one permutation in the unit mapping strategy to the remaining permutations is still unknown.

Nevertheless, this information can be utilised to determine the unit size. This is done by, in step 210, iterating forward and backwards through the codewords until a change in the permutation is detected. The difference between these points is then the stripe-unit size.

The method then proceeds to step 212.

However, in some cases the unit size cannot be recovered. If, for example, the unit mapping strategy only has one permutation (e.g., as with dedicated parity) then alternative methods must be used.

Step 212: Recover Array Boundaries

In step 212, the first and last stripes of the array 108 are found.

This is done on a logarithmic basis by searching through the storage components 106 using a binary search. For each iteration of the search, the search is continued in that direction if the raw data decodes correctly. Otherwise the direction of the search is switched until the boundaries are determined.

This approach assumes that the entire array 108 is properly encoded and initialised. One problem that may arise is when multiple arrays share the same set of storage components and have a similar layout. In this case the search may cross over one array boundary and not recognize that it is working in a different array space. This may be addressed by the encoding of the second embodiment.

Once the boundaries have been recovered, the method proceeds to step 214.

Step 214: Retrieve Unit Mapping Strategy

The unit mapping strategy permutes units of a stripe across the member storage components, on a per stripe basis. In step 214 this strategy is recovered.

Data encoded into a codeword and permuted can be written as set out in equation 13):

$$dG\pi_s = c_\pi \qquad 13)$$

where $\pi_s$ is the permutation matrix for stripe s and $c_\pi$ is the permuted codeword. Or in other words, vector component x in $c_\pi$ is mapped to storage component x.

With this formulation, the unit mapping strategy can be described as an ordered set of n permutations that are cycled over the stripes. Given permutation set $\Pi = \{\pi_0, \pi_1, \ldots \pi_{n-1}\}$ then $\Pi_{i \bmod n}$ selects the permutation at stripe i. Alternatively, the set of permutations as a matrix is set out in equation 14):

$$M = \begin{bmatrix} n\pi_0 \\ n\pi_1 \\ M \\ n\pi_{n-1} \end{bmatrix} \qquad 14)$$

where n is the first n natural numbers, $n = [i]_{i=0}^{n-1}$.

Matrix M then represents the mapping of codeword symbols onto storage components 106. This is interpreted as the codeword symbol $M_{i,j}$ is mapped to storage component j when stripe number s mod n=i.

This is used in step 214 to construct a permutation $\pi_x$ from the raw data on the RAID array 108, in part, from the candidate basis vectors with $\log_{\alpha_i} . u$. However, the checksum symbols also need to be included into the permutation so that the order of message and checksum data with respect to the storage components are preserved in $\pi_x$ because the position of checksum $c_i$ is k+i.

Consequently, if the unit size has been determined in step 210, then the process can proceed to subsequent stripe boundaries, recover the basis vectors at each said boundary, and the full set of permutations from the raw data can be obtained as set out in equation 15):

$$M_d = \begin{bmatrix} \pi_{x+0} \\ \pi_{x+1} \\ M \\ \pi_{x+n-1} \end{bmatrix} \qquad 15)$$

After the first stripe in the array is identified, its symbol map can be used to identify which row y in $M_d$ is the first row of the permutation set. When y is recovered, $M_d$ is row rotated by -y to recover the unit mapping strategy.

In other words, the position of stripe-units in the array are recovered from the basis vector, and then the full mapping strategy is recovered by recovering the basis vectors (and thus unit positions) from multiple sequential stripes.

Further, the storage component order is also recovered with respect to the code. However, even though row rotated $M_d$ is the unit mapping strategy, it may still be necessary to correlate the mapping with a labelled strategy (e.g. left symmetric, etc). In general, data is mapped onto a set of storage components starting at an arbitrary offset in the array using a specific strategy M as follows:

$$RMC = M_d \qquad 16)$$

where R is a row permutation matrix and C is a column permutation matrix. C in essence relates to the order of storage components. R is restricted to being a row rotation matrix since the strategy is applied cyclically over the entire array.

For example, define R=I because $M_d$ is known to sit on a cycle boundary. The column permutation is then recovered with $C=M^{-1}M_d$ for the labelled unit mapping strategy whose M results in a true column permutation matrix. However, when R is not identity, in some cases we can still recover the exact unit mapping strategy by introducing the concept of a unit mapping strategy signature.

Equations 17) and 18) below is an example strategy signature. Row vector s is comprised of n elements where each element in s is based on a column in M. The column is indexed by j (not shown in equations 17) and 18)).

Further, the row index wraps around at the matrix boundary. This particular example signature accumulates the absolute difference at each transition in a column, where the column changes from a message symbol to a checksum symbol between rows and vice versa.

FIGS. 5a) to 5d) show four common unit mapping strategies. These examples illustrate a k=4, m=2 configuration. Each row is a permutation of the enumerated codeword symbols. Checksum symbols are shaded.

The above approach in step 214 creates a unique signature for each of the four common strategies listed in FIG. 4 when m<k. The example strategy signature for matrix A is written as:

$$s(A) = \left[\sum_i f(A_i, A_{i+1})\right]_{j=0}^{n-1}, \qquad 17)$$

$$f(a, b) = \begin{cases} |a-b| & \text{if } a < k \le b \\ |a-b|*n & \text{if } a \ge k > b \\ 0 & \text{otherwise} \end{cases} \qquad 18)$$

The above expressions define each element in the signature as belonging to a base n numeral system with transitions acting as digits.

For example, consider the left-asymmetric strategy signature that is shown in FIG. 4a), With n=6, the first element is $|0-4|n^0+|5-0|n^1=34$.

In the context of identifying strategies, $M_d$ equals M when:

$$\forall x[x \in S(M_d) \to x \in S(M)] \qquad 19)$$

However, this approximation only holds when each signature in the set of all supported strategies is unique. In this case, the formulation is also row rotation and column permutation invariant. That is, the unit mapping strategy can be named without knowing R or C.

Further, when each element in a given signature is unique, the column permutation C can be recovered. In Cauchy's two-line notation:

$$C = \begin{pmatrix} 0 & 1 & \cdots & n-1 \\ \sigma(0) & \sigma(1) & \cdots & \sigma(n-1) \end{pmatrix} \qquad 20)$$

$$\sigma(x) = y | S(M)_x = S(M_d)_y,$$

Using Equation 20, permutation matrix C can be recovered for element-wise unique signatures such as with the left and right-asymmetric strategies shown in FIGS. 5a) and 5c). Once C is known, the row rotation matrix is then $R=M_d C^{-1} M^{-1}$.

However, in the situation where a strategy's signature is not element-wise unique, we cannot recover C until R is known first. Once R is identified (e.g., by finding the first or last stripe), then $C=M^{-1} R^{-1} M_d$.

Step 216: Rebuild Configuration Metadata

Once the above steps have been carried out, the following parameters have been determined from the raw data:
1) Stripe-group width n;
2) Message data units per stripe k;
3) Checksum data units per stripe m;
4) Symbol size w;
5) Basis root for each checksum in the code;
6) Unit size;
7) Unit mapping strategy;
8) Array membership, and
9) Boundaries of the array.

Based on these parameters, replacement configuration metadata can be generated and stored. The method then proceeds to step 218.

Step 218: Empirically Validate Layout

As set out above, reconfiguring and bringing an array online with an incorrect layout could result in corruption or destruction of the raw data remaining on the array 108.

Therefore, optionally, an empirical validation should be carried out on the proposed parameter data to ensure that the data matches the array. This may be by way of a parity check of the remaining data.

Once validated, the method can then progress to step 220.

Step 220: Bring Array Online

At step 220, the validated configuration metadata can be used to bring the array back online. At this point, the recovery process is completed. A log may be stored for reference should the configuration metadata become damaged or corrupted at a later stage.

A method according to a second embodiment of the present invention will now be described with reference to FIGS. 7 and 8.

The method of the first embodiment described above relates to a procedure for recovery of conventional RS encoded RAID array configuration information. However, it is possible to modify the coding procedure to enable more accurate and more easily rectifiable code. The second embodiment of the invention implements this.

The second embodiment of the present invention defines modifications to the standard RS code to yield a code which enables more straightforward rectification. The following rectification-assisting code is proposed in equations 21) and 22):

$$g = \Delta(\lambda_i^0 c_i) + \sum_{j=0}^{n-1} \lambda_i^{j+1} \Delta(d_j) \qquad 21)$$

$$c_i = \Delta^{-1}\left[g + \sum_{j=0}^{n-1} \lambda_i^{j+1} \Delta(d_j)\right] \quad 22)$$

The basis for the above strategy will be to provide a data structure that defines important layout configuration parameters and casts these into an element in the field to use in the code as a basis root. Consequently, when the coefficients are recovered, additional information about the layout is provided. The following description addresses how the various code modifications address issues with rectification.

Symbol Position Ambiguity

An ambiguity occurs when the basis root is one. Consider Equation 9 where $Du = d_k$.

When the basis root is 1, u resolves to be a vector of ones. Therefore, in a conventional RS code, it is not possible to determine the position of message symbols from $\log_{\alpha_i} u$ alone.

In the present invention, this is done by providing a basis root greater than one for all checksums. However, this results in a modification in which the first checksum calculation is no longer a simple XOR summation of the message data. All checksums will require finite field multiplication.

However, if there is more than one checksum in the code, position information can still be recovered from another (non-one based) checksum. In this case, once the positions of the message data are known, the one-based checksum position can be implied.

Combinatorial Problem

Given a set of n storage components that comprises a k+m array, there are $$\binom{n}{k}$$

possible combinations to test to recover the first basis vector using Equation 9.

For example, consider a RAID array 108 where n=14 and m=2. In this case, there a maximum of $$\binom{14}{12} = 91$$

combinations to test.

The search space, however, can be reduced by rewriting the checksum equation as set out in equation 23)

$$g = c_i + \Sigma_{j=0}^{n-1} \alpha_i^j d_j \quad 23)$$

where g is a non-zero constant. Now the checksum can be included in the raw data matrix so that the unknown coefficients u are solved with $u = D^{-1}g$, where g in this context is a constant vector. Building on the same example, the search space is significantly reduced from 91 to $$\binom{14}{13} = 14$$

combinations.

Any penalty incurred with this modification is minimal. When encoding, the checksum initialisation value is simply changed from zero to g.

A similar issue occurs when trying to recover multiple arrays from a pool of storage components. Suppose, for instance, there are three k=8, m=2 RAID 6 arrays 108 buried in 30 storage components 106. To recover a first basis vector yields $$\binom{30}{9} = 14,307,150$$

combinations. This is potentially intractable.

However, by using a similar approach as for a single array, several basis vectors can be recovered simultaneously by building a raw data matrix representing (k+1)*a equations, where a is the number of arrays 108 to recover.

However, when the equations are put together, they will be rank deficient if all arrays use the same value of g. A geometric progression of values is thus implemented so that each array is assigned a unique identifier and:

$$g = 2^a \quad 24)$$

where a is the array ID. Continuing on with the previous example, the search space is now reduced to $$\binom{30}{27} = 40,060$$

combinations.

Singular Raw Data Matrix Problem

As discussed previously, raw data matrix D must be an invertible matrix in order for the proposed method to work. However, in reality, raw data can be highly repetitious. Consider, for example, an array that is initialised with a write-zeros policy for array consistency initialisation or a software entity that adds padding to its files.

In these situations, raw data is not likely to be invertible. Nevertheless, this can be avoided by first translating all data in the code. We describe data translation as follows:

$$\partial_{i,j} = \Delta(d_{i,j}, i, j) \quad 25)$$

where j is a storage component index and i is an address within the storage component.

In shorthand equation 25) can be written as $\partial_j = \Delta(d_j)$ with the remaining parameters implied. The translated raw data matrix is denoted as $D_\partial$. Translation function $\Delta$ takes data $d_{i,j}$ and transforms said data into $\partial_{i,j}$ using characteristics of storage component j at address i.

We also require that $\Delta$ is an involutary function—$\Delta$ is its own inverse, so that $\Delta(\Delta(d_{i,j})) = d_{i,j}$. For example, XOR can be used to create an involutary function (e.g. $A \oplus (A \oplus B)) = B$).

The translation function $\Delta$ is required to be predictable, repeatable, and independent of all configuration parameter characteristics. This independence is required because when data is read from a storage device, there is no knowledge of what data is being read, i.e. whether the read data is message or checksum data. Consequently, it is preferred that the translation function is based only on persistent characteristics of the storage component such as its SCSI logical unit address if applicable.

Message data is translated for the purpose of encoding only and the original unmodified data $d_{i,j}$ is written to storage component j. However, for checksum data the translated redundancy information Δ ($c_i$) must be written out to storage. This is necessary because all data must be translated by Δ when building the transformed raw data matrix $D_\ominus$. However, when data is read from the storage during recovery it is unknown whether the data is message data or checksum information. This means it is necessary to translate all data with the same function.

So by writing Δ ($c_i$) to storage, all data read back can be safely translated when the translated data matrix $D_\ominus$ is built, due to Δ (Δ ($c_i$)=$c_i$.

One possible translation function which can be utilised with the present invention is a function which utilises a non-cryptographic hash function. A hash value is generated from the storage component's logical unit address and codeword address. Therefore, the hash function must exhibit good avalanching properties because the logical unit address may only differ by one between the storage components, and because codeword symbol addresses are also sequential. Therefore, small changes in the input must produce large changes in the output.

Whilst a hash function is generally associated with a large overhead, in this embodiment of the present invention, this can be handled very efficiently. The translation function is arranged to minimise the probability of encountering a singular matrix.

Additionally, the raw data matrix needs only to stack a minimum set of equations to solve for the unknowns. Therefore, the logical address modulo can be taken as an appropriate integer and used as a parameter to the hash function. Therefore, the set of hash values for a storage component can be pre-computed for a sufficiently small set size.

This can be expanded on and refined. As is known, the transition function is merely XOR. Therefore, all of the hashes are reduced to a constant value as set out in equations 26) to 29) below:

$$c_i = \Delta^{-1}\left[g + \sum_{j=0}^{n-1} \lambda_i^{j+1} \Delta(d_j)\right] \quad 26)$$

$$= g + \left(\sum_{j=0}^{n-1} \lambda_i^{j+1}(d_j + h_j)\right) + h_c \quad 27)$$

$$= \left(\sum_{j=0}^{n-1} \lambda_i^{j+1} d_j\right) + \left(\sum_{j=0}^{n-1} \lambda_i^{j+1} h_j\right) + h_c + g \quad 28)$$

$$= \left(\sum_{j=0}^{n-1} \lambda_i^{j+1} d_j\right) + K, \quad 29)$$

where $h_j$ is the hash value computed for storage component j at the associated codeword address and $h_c$ is the like checksum, storage component hash value.

The equations above illustrate that the hash values can be combined with constant g to form a new constant K at the associated codeword address. Therefore, the penalty is only one additional lookup for each codeword into a pre-computed table rather than a hash computation for each symbol in the codeword.

Basis Root Modification

Traditionally, basis roots are selected in sequential order starting with 1, 2 etc. However, other coefficients may be used to encode checksum data, provided that the generator matrix is invertible.

Therefore, basis roots may be used which, when recovered, yield additional information about the array configuration parameters. One strategy to accomplish this is to create a w-bit binary representation of the most critical configuration parameters to enhance recovery. This basis root is denoted A and this appears in the equations 26) to 29) set out above.

The basis root λ comprises a set of parameters. Firstly, the CRC field is included in λ to provide an additional level of verification in the rare case that random data decodes into a proper geometric series. Further, by using a CRC, the basis root in u is quickly identified. The basis root λ also encodes the value of m and so the recovery process can readily determine how many checksums are in a code after the first basis vector is recovered. A checksum index i is also encoded in the basis root λ to identify which checksum is the basis vector.

Additional parameters can be encoded into the basis root λ. For example, the array number (if multiple arrays are present on a storage system), the stripe number and the first permutation (the "first" flag).

The use of the basis root λ can enable a number of recovery problems to be addressed.

For example, if the unit mapping strategy contains only a single row, then the least significant bit of each stripe group number can be used (the "stripe no" field). Since this will cause the basis root to change at stripe, monitoring changes while traversing through the raw data will alternatively allow for recovery of the unit size.

When recovering a unit mapping strategy that is ambiguous, i.e. one that requires the first row of the permutation matrix to be known to solve Equation 16), then the "first" flag can be utilised.

Each codeword generated on the first row of the unit map matrix will have the first flag set to one. Otherwise the flag is set to zero. Therefore, when the basis root is recovered, the RAID software 116 will know whether the data comes from the first row or not. Once the first row is known, R is also known and the storage component order C can be recovered.

In case λ generates a geometric series with a period less than k, the selector field allows for various alternative basis roots that encode the same layout parameters.

A problem can also be addressed with regard to array boundaries. A binary search over a storage component to find the first and last stripes of an array can be problematic if multiple arrays exist on the same set of storage components and have a similar layout. However, through the use of λ defining a set of parameters and assigning a unique number to each array, the identifier can be encoded into each codeword using the array no field in λ. Therefore it is clear when the search process has crossed over a boundary into another array.

The array no field also solves the issue of identifying which storage components belong to which arrays when recovering multiple arrays simultaneously. Since the array identifier is built into λ, the basis root of each array is unique. By following the geometric series, membership of the storage components can be determined.

Intuitively a larger symbol size will allow more layout information to be encoded into the basis root λ. For example, a w=32-bit code, for instance, could be implemented using Intel's Streaming SIMD Extension (SSE) instruction set.

The following method utilising the above rectification RS code is described with reference to FIG. 6.

Step 300: Write Request to Controller

At step 300, the host 102 generates a write request for a specific volume (e.g. storage device 106*a*) to which it has been assigned access rights. The request is sent via a communication network to the host ports (not shown) of the RAID controller 104. The write command is then stored in a local cache (not shown) forming part of the RAID controller hardware 120 of the RAID controller 104.

The RAID controller 104 is programmed to respond to any commands that request write access to the storage device 106a. The RAID controller 104 processes the write request from the host 102. The method then proceeds to step 302.

Step 302: Generate Codeword

The RAID controller 104 utilises the message data sent in step 300 to generate a codeword in accordance with equations 26) to 29). In other words, the RAID controller 104 utilises the modified Reed-Solomon code of the present invention to generate the parity information forming part of the codeword. The codeword comprises the message data plus parity information generated from the message.

During codeword generation, message data and checksum data are translated in accordance with the translation function A to generate a translated raw data matrix $D_\ominus$.

Once the codeword is generated, the method proceeds to step 304.

Step 304: Write Message Data to Storage Component

Once the codeword has been generated, the message data part of the codeword (i.e. unmodified data $d_{i,j}$) can be written to the storage component j. It is not necessary to write the translated data $\Delta(d_{i,j})$ to storage.

The method proceeds to step 306.

Step 306: Write Translated Checksum Data

For checksum data, the translated redundancy information $\Delta(c_i)$ must be written out to storage. This is necessary because all data must be translated by $\Delta$ when building the transformed raw data matrix $D_\ominus$ during decoding of the data.

Step 308: Finish or Repeat

At step 308, the writing of the data together with parity information is complete. The method may then proceed back to step 300 for further message data or may terminate.

The arrangement of the modified RS code according to the second embodiment of the present invention is used in the same manner as the method of the first embodiment set out above. However, the encoding enables a more robust procedure to be carried out when rectifying the RAID array 108.

In general, the method of rectification is similar to that of the first embodiment. However, the use of the translated format means that additional modifications are necessary.

When data is read from the storage during recovery it is unknown whether the data is message data or checksum information. This means it is necessary to translate all data with the same function.

As set out above, $\Delta(c_i)$ is written to storage. Therefore, when checksum data is read back in step 402, it can be safely translated when the translated data matrix $D_\ominus$ is built, due to $\Delta(\Delta(c_i))=c_i$.

Message data is, however, not stored in translated format, so can be translated back into this format using $\Delta$.

In addition, the array constant g can be obtained to provide information on the number and format of the arrays.

The data can then be analysed in accordance with the method of the first embodiment as set out in steps 200 to 220.

Variations of the above embodiments will be apparent to the skilled person. The precise configuration of hardware and software components may differ and still fall within the scope of the present invention.

For example, the present invention has been described with reference to controllers in hardware. However, the controllers and/or the invention may be implemented in software. This can be done with a dedicated core in a multi-core system. Given a proper software algorithm, it should be feasible to calculate protection information in parallel with array parity so that each piece of user data is read only once.

Additionally, whilst the present embodiment relates to arrangements operating predominantly in off-host firmware or software (e.g. on the RAID controller 104), an on-host arrangement could be used.

Alternatively, symbols other than 16-bit symbols could be used. The skilled person would be readily aware of the different symbol sizes that could be used with the present invention.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method comprising:
   detecting a loss of configuration metadata for a redundant array of independent disks (RAID), the configuration metadata providing a format of stripe units stored in data storage devices of the RAID;
   reading raw data stored in the RAID, the raw data comprising message data and checksum data;
   defining a set of linear equations on a computing device using said message data and checksum data;
   solving said set of linear equations with the computing device; and
   recovering the configuration metadata from the solved set of linear equations.

2. The method of claim 1, wherein a matrix equation is formed based on said set of linear equations, said matrix equation comprising a matrix based on said raw data, the matrix being inverted to obtain a set of coefficients that recover the configuration data of said RAID array.

3. The method of claim 2, wherein the configuration metadata comprises a checksum basis vector used to generate one of said checksums comprising said checksum data.

4. The method of claim 3, further comprising repeating the reading, defining, solving, and recovering steps to generate further checksum basis vectors for further checksums, each checksum basis vector being used to generate one of said checksums.

5. The method of claim 4, wherein each checksum basis vector is verified using a geometric series subsequent to solving the set of linear equations.

6. The method of to claim 4, wherein the RAID array comprises a plurality of stripe groups, each stripe group comprising a plurality of the stripe units, the configuration metadata comprising a stripe unit size of one of the plurality of stripe units.

7. The method of claim 6, wherein the configuration metadata comprises a unit mapping strategy, the method further comprising:
   iterating through said codewords to identify a change in codeword permutation;
   identifying the stripe unit size based on said change in codeword permutation;
   obtaining said unit mapping strategy based on said plurality of checksum basis vectors and said stripe unit size by recovering the position of said stripe units within an array from said checksum basis vectors; and repeating the recovering step for multiple sequential stripe groups to obtain the unit mapping strategy.

8. The method of claim 1, wherein the configuration metadata comprises a stripe group width, a number of message data units per stripe, a number of checksum data units per stripe, and a symbol size, the configuration metadata determined empirically prior to the reading step.

9. The method of claim 1, wherein the configuration metadata comprises a plurality of parameters relating to a layout of said RAID.

10. The method of claim 9, further comprising verifying data consistency across the entire RAID subsequent to the recovering step.

11. The method of claim 10, further comprising bringing the RAID online with the recovered configuration metadata.

12. The method of claim 1, wherein a RAID hardware controller recovers the configuration metadata and the RAID is erasure encoded.

13. The method of claim 12, wherein the RAID hardware controller reads data from and stores data to at least one storage device.

14. The method of claim 1, wherein a non-transitory computer usable storage medium of the RAID stores a computer program product executed by a programmable processing apparatus to recover the configuration metadata.

15. A method comprising:
  detecting a loss of configuration metadata for a redundant array of independent disks (RAID), the configuration metadata providing a format of stripe units stored in data storage devices of the RAID;
  reading raw data stored in the RAID, the raw data comprising message data and checksum data;
  defining a set of linear equations on a computing device using said message data and checksum data;
  solving said set of linear equations with the computing device;
  recovering the configuration metadata from the solved set of linear equations;
  utilizing Reed-Solomon encoding to encode message data and an array unique identifier to form a codeword comprising message data and checksum information comprising a plurality of checksums; and
  writing said codeword to said RAID said basis root being greater than one for all checksums.

16. The method of claim 15, wherein further comprising:
  translating said message data using an involuntary function to generate translated message data and translated checksum information;
  writing untranslated message data to said RAID; and
  writing translated checksum data to said RAID.

17. A method comprising:
  detecting a loss of configuration metadata for a redundant array of independent disks (RAID), the configuration metadata providing a distribution, number, and size of stripe units stored in data storage devices of the RAID;
  reading raw data stored in the RAID, the raw data comprising message data and checksum data;
  defining a set of linear equations on a computing device using said message data and checksum data;
  solving said set of linear equations with the computing device;
  recovering the configuration metadata from the solved set of linear equations.

18. The method of claim 17, further comprising:
  utilizing Reed-Solomon encoding to encode message data to form a codeword comprising message data and checksum information comprising a plurality of checksums, said message data being encoded using a w-bit basis root for the basis vector for the or each checksum, said w-bit basis root storing configuration parameters for said RAID; and
  writing said codeword to said RAID.

19. The method of claim 18, wherein said w-bit basis root for the basis vector comprises one or more configuration parameters selected from the list of: CRC field; number of checksums per stripe group; stripe number; array number; and
  a first row of the unit mapping identifier.

20. The method of claim 19, wherein the w-bit basis root comprises an 8, 16 or 32 bit basis root.

* * * * *